United States Patent [19]
Bailey, Jr. et al.

[11] 4,261,955
[45] Apr. 14, 1981

[54] VERTICAL TYPE POROUS MEMBRANE HYDROGEN GENERATOR

[75] Inventors: Cornelius E. Bailey, Jr., Washington, D.C.; Walter G. Taschek, Prince William County, Va.

[73] Assignee: The United States of America as represented by the Secretary of the Army, Washington, D.C.

[21] Appl. No.: 939,028

[22] Filed: Sep. 1, 1978

[51] Int. Cl.³ .............................................. B01J 7/02
[52] U.S. Cl. ........................................ 422/239; 48/4; 48/61; 422/238; 423/657; 429/19
[58] Field of Search .............. 422/239, 238, 117, 129, 422/305, 120, 236; 429/17, 19; 423/657; 48/61, 4 (U.S. only)

[56] References Cited

U.S. PATENT DOCUMENTS

| | | | |
|---|---|---|---|
| 2,463,863 | 3/1949 | Gibaldo | 422/239 |
| 3,649,360 | 3/1972 | Bloomfield et al. | 429/19 |
| 4,155,712 | 5/1979 | Taschek | 422/239 |

*Primary Examiner*—Joseph Scovronek
*Attorney, Agent, or Firm*—Nathan Edelberg; Robert P. Gibson

[57] ABSTRACT

The disclosure concerns an apparatus for generating gas by the reaction of a water reactive gas producing fuel with water vapor. A chamber houses the metal hydride fuel and a water vapor is introduced into the fuel chamber through a pair of spaced porous hydrophobic membranes. Reaction of the water vapor with the fuel produces a gas such as hydrogen (if calcium hydride fuel is used) or oxygen for use in a fuel cell. A "dead space" is positioned between the porous hydrophobic membranes which provides a safety feature that is unique in its use. If, during operation, an excessive sudden demand is made for the generated gas, i.e. hydrogen, and in turn for water vapor, with this invention, unvaporized water which might be pulled through the outer membrane or membranes will then pass through the hydrogen outlet rather than accidently directly contacting the fuel.

5 Claims, 2 Drawing Figures

VERTICAL TYPE POROUS MEMBRANE HYDROGEN GENERATOR

DEDICATORY CLAUSE

The invention described herein may be manufactured, used, and licensed by or for the Government for governmental purposes without the payment to us of any royalties thereon.

BACKGROUND OF THE INVENTION

This invention relates to the field of hydrogen generators.

Among the problems in the use of demand responsive hydrogen generators is that of a sudden requirement made on the water vapor such that water instead of the water vapor could be drawn into direct contact with the fuel, thus causing a malfunction. This is an improvement over the gas generator disclosed in U.S. Pat. No. 4,155,712, invented by one of the co-inventors of the present invention.

SUMMARY OF THE INVENTION

The present invention has provided a solution to the above stated problem by utilizing novel wall means for separating adjacently disposed solid fuel and water compartments. The novel wall means includes two spaced apart porous hydrophobic membranes. During normal production of hydrogen gas, the membranes are of a character as to normally only pass water vapor from the water supply to the fuel compartment. However, if an abnormal demand is made on the water vapor, it could inadvertently cause unvaporized water to pass through one of the membranes. With the present invention, the demand in the hydrogen gas outlet, which outlet is positioned between the spaced-apart membranes, would pull off the water before it could reach the metal hydride fuel. This is because the second membrane forestalls water passage to the fuel.

This invention may be better understood from the following detailed description taken in conjunction with the accompanying illustrative drawings.

DESCRIPTION OF THE PREFERRED EMBODIMENT

Figure 1:
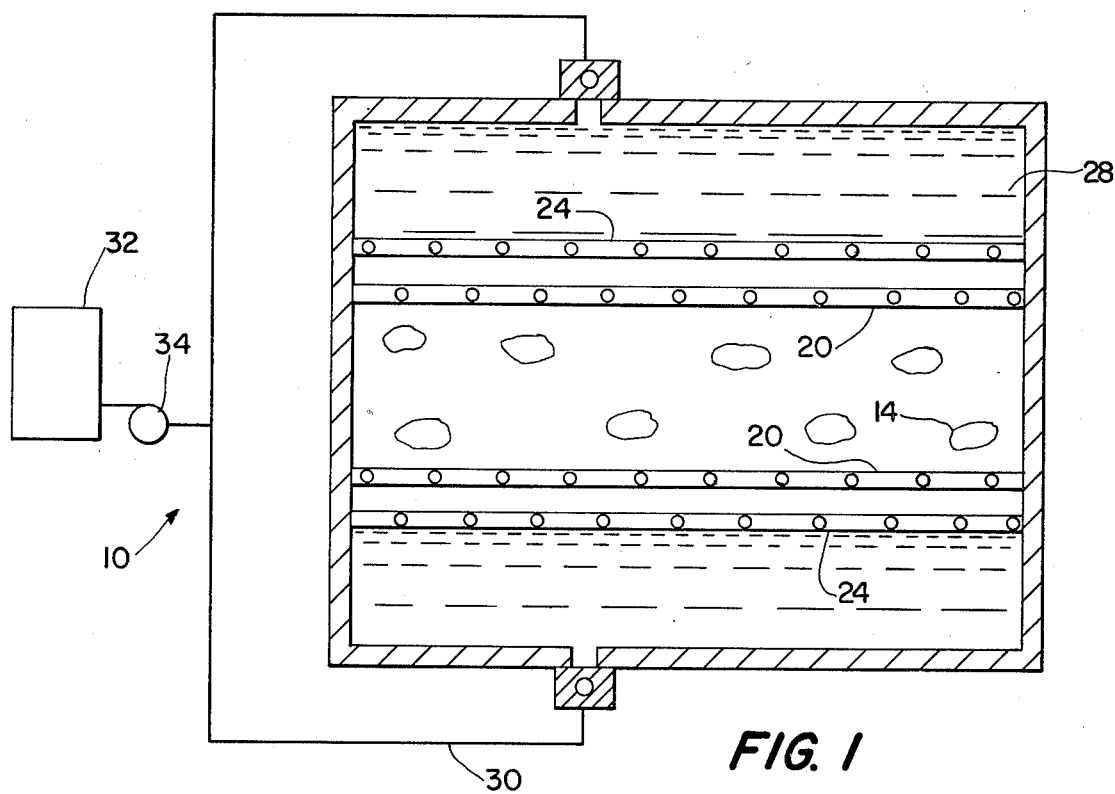
FIG. 1 is a horizontal cross sectional view of the generator taken approximately on line 1—1 of FIG. 2, showing the connection to the water reservoir.
Figure 2:
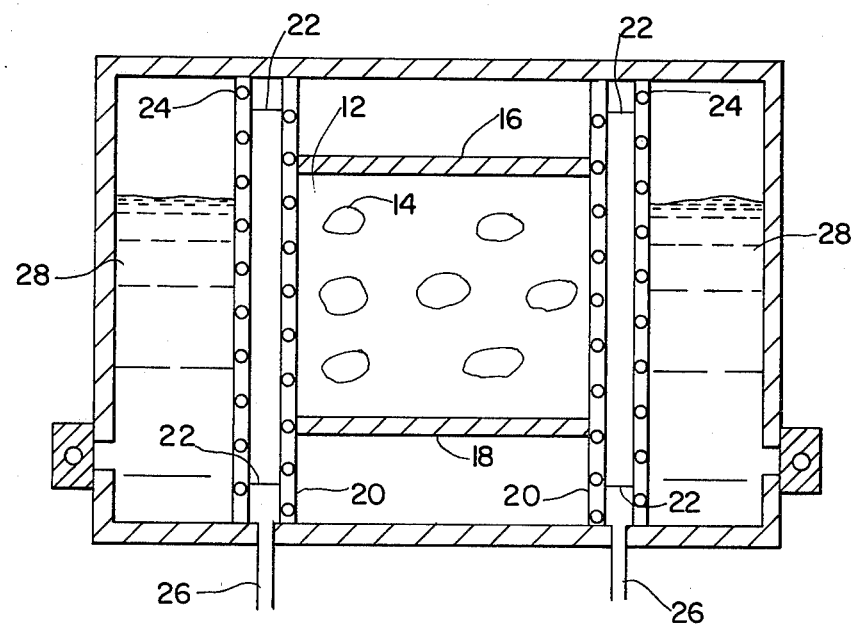
FIG. 2 is a vertical cross sectional view of the generator taken approximately on line 2—2 of FIG. 1.

As seen in the illustrative drawings, the generator 10 is depicted as a rectangular box and includes a suitable fuel compartment 12 for storing metal hydride fuel 14. The, as shown, compartment includes a cover 16 and a floor 18 that extends the length of the generator. The longitudinal side walls of the illustrative fuel compartment are parallel and preferably comprised of the innermost vertical porous hydrophobic membranes 20. Reference numeral 22 identifies suitable wall spacers having openings therein or otherwise constructed for permitting gas passage. These spacers separate the innermost membranes 20 from a similar second set of preferably parallel porous hydrophobic membranes 24 and provides a hydrogen gas passageway to outlets 26. As shown, a water chamber 28 is provided between the outer membranes 24 and the outer side walls 11 of the generator. These water chambers are connected by a supply pipe 30 to a water reservoir 32 and a manifold 34 is provided to balance the flow of water therebetween.

In operation, when an electrical load is placed on the fuel cells (not shown), the fuel cell demands hydrogen from the generators hydrogen outlet 26. This demand causes the level of water in the water chamber 28 to rise thereby causing more water vapor to pass through membranes 24 and 20 into contact with the fuel 14 where hydrogen is produced. Produced hydrogen flows out the outlets 26 as needed. If an abnormal sudden demand is made for hydrogen by the fuel cell, the sudden demand might cause unvaporized water to pass through one or more of the outer membranes 24, with a tendency to be drawn also through the inner membrane or membranes 20 except for the novel use of the spaced membranes and intermediate outlets 26. Thus, unvaporized water will be pulled through the hydrogen outlet or outlets 26, rather than through membrane or membranes 20, and avoids directly contacting fuel. It is understood that other hydrogen-consuming devices other than a fuel cell can be used in conjunction with this generator which could also place an abnormal hydrogen demand on the generator.

The porous membranes may be fabricated of any suitable material having hydrophobic characteristics. One such material is a porous Teflon material.

It is understood that while a specific embodiment has been depicted for illustrative purposes, it will be apparent to those skilled in the art that various changes and modifications can be made without departing from the spirit and scope of the invention as set forth in the appended claims.

We claim:

1. A demand responsive gas generator for producing gas by chemical reaction of a solid fuel upon controlled exposure to a liquid vapor, said generator comprising:
    (1) a fuel compartment for storing solid fuel;
    (b) a separate liquid compartment adjacently spaced apart from said fuel compartment and having means to receive liquid water supplied thereto under a suitable pressure from an external reservoir in a controlled manner;
    (c) wall means between said fuel and water compartments to maintain said compartments in spaced apart relation;
    (d) said wall means comprising at least one pair of spaced apart porous hydrophobic membranes adapted to pass gaseous and vaporous mediums while simultaneously adapted to restrict free passage of liquid water under normal demand operation, said membranes designated as a first membrane closest to and forming part of said liquid compartment, and a second membrane closest to and forming part of said fuel compartment;
    (e) spacer means for maintaining said membranes in spaced apart relation so as to form a gas passageway therebetween; and
    (f) outlet means connected with said gas passageway for conducting produced gas away from the generator to an external gas utilization means, and for also conducting away any excess liquid water collecting therein,
    (g) whereby an abnormal demand for gas utilization may cause a substantial sudden decrease in gas pressure in the gas passageway tending to cause liquid water to pass through said first membrane, and which liquid water is also directable away from said generator through said outlet means before it can permeate the second membrane into said fuel compartment.

2. The gas generator as defined in claim 1, wherein said membranes are formed of porous Teflon sheet material.

3. In a demand responsive hydrogen generator for producing hydrogen gas by chemical reaction of a solid fuel upon controlled exposure to a water vapor, wherein the generator includes a separate solid fuel compartment and liquid compartment means to receive controlled amounts of liquid water, and further includes a gas discharge outlet, wall means separating said fuel and liquid compartments, with the wall means having a hydrophobic porous membrane area adapted to pass gaseous and vaporous mediums while also restricting free passage of liquid water therethrough, the improvement wherein (a) said wall means comprises a pair of spaced apart hydrophobic membranes; and (b) said generator further includes suitable spacer means for maintaining said membranes in spaced-apart relation to form a gas passageway therebetween, said spacers being of a character so as to permit gas produced in said fuel compartment to freely pass by said spacer means enroute to said gas discharge outlet.

4. The gas generator as defined in claim 3, wherein said fuel compartment is bounded on two sides with said water compartment means and with interposed wall means comprising said spaced apart hydrophobic membranes to provide increased gas generation capabilities, said wall means being interposed between said fuel compartment and liquid water introducable into said water compartment means.

5. The gas generator as defined in claim 3, wherein said fuel compartment is bounded on a major part of its periphery with said water compartment means and said fuel compartment being separated along said major part of its periphery from the aforesaid water compartment means by said wall means comprising said spaced apart hydrophobic membranes.

* * * * *